(12) United States Patent
Suzuki et al.

(10) Patent No.: US 6,681,912 B2
(45) Date of Patent: Jan. 27, 2004

(54) DRIVING FORCE DISTRIBUTING APPARATUS

(75) Inventors: Satoru Suzuki, Kosai (JP); Yuzo Geshi, Kosai (JP)

(73) Assignee: Fujiunivance Corporation (JP)

( * ) Notice: Subject to any disclaimer, the term of this patent is extended or adjusted under 35 U.S.C. 154(b) by 0 days.

(21) Appl. No.: 10/127,253

(22) Filed: Apr. 22, 2002

(65) Prior Publication Data

US 2002/0162722 A1 Nov. 7, 2002

(30) Foreign Application Priority Data

May 7, 2001 (JP) ........................................ 2001-135962

(51) Int. Cl.⁷ ............................................. B60K 17/34
(52) U.S. Cl. .................. 192/85 AA; 180/233; 192/101; 701/34
(58) Field of Search ........................ 192/85 AA, 106 F, 192/101, 84.6; 180/248, 233, 251; 701/75, 76, 34; 477/906

(56) References Cited

U.S. PATENT DOCUMENTS

| | | | |
|---|---|---|---|
| 4,874,056 A | 10/1989 | Naito | |
| 5,119,298 A | * 6/1992 | Naito | 180/248 |
| 5,251,719 A | * 10/1993 | Eto et al. | 180/248 |
| 5,644,916 A | 7/1997 | Hayasaki | |
| 5,819,192 A | * 10/1998 | Wakahara et al. | 180/247 |
| 6,009,968 A | 1/2000 | Kouno | |

* cited by examiner

Primary Examiner—Rodney H. Bonck
(74) Attorney, Agent, or Firm—James B. Conte; Barnes & Thornburg

(57) ABSTRACT

The present invention provides a driving force distributing apparatus which can instantaneously reduce clutch pressure to thereby carry out proper operation of an ABS even if the ABS is actuated in traveling in a 4WD mode. In order to reduce pressure in a piston chamber, a control circuit drives a motor for reverse rotation. As a result, a pressure difference between a piston chamber side pressure and a pump side pressure in a supply path becomes large, pressure oil on a piston chamber side in the supply path is instantaneously discharged to an outside from a releasing hole of a quick open valve, and the pressure in the piston chamber reduces instantaneously.

8 Claims, 8 Drawing Sheets

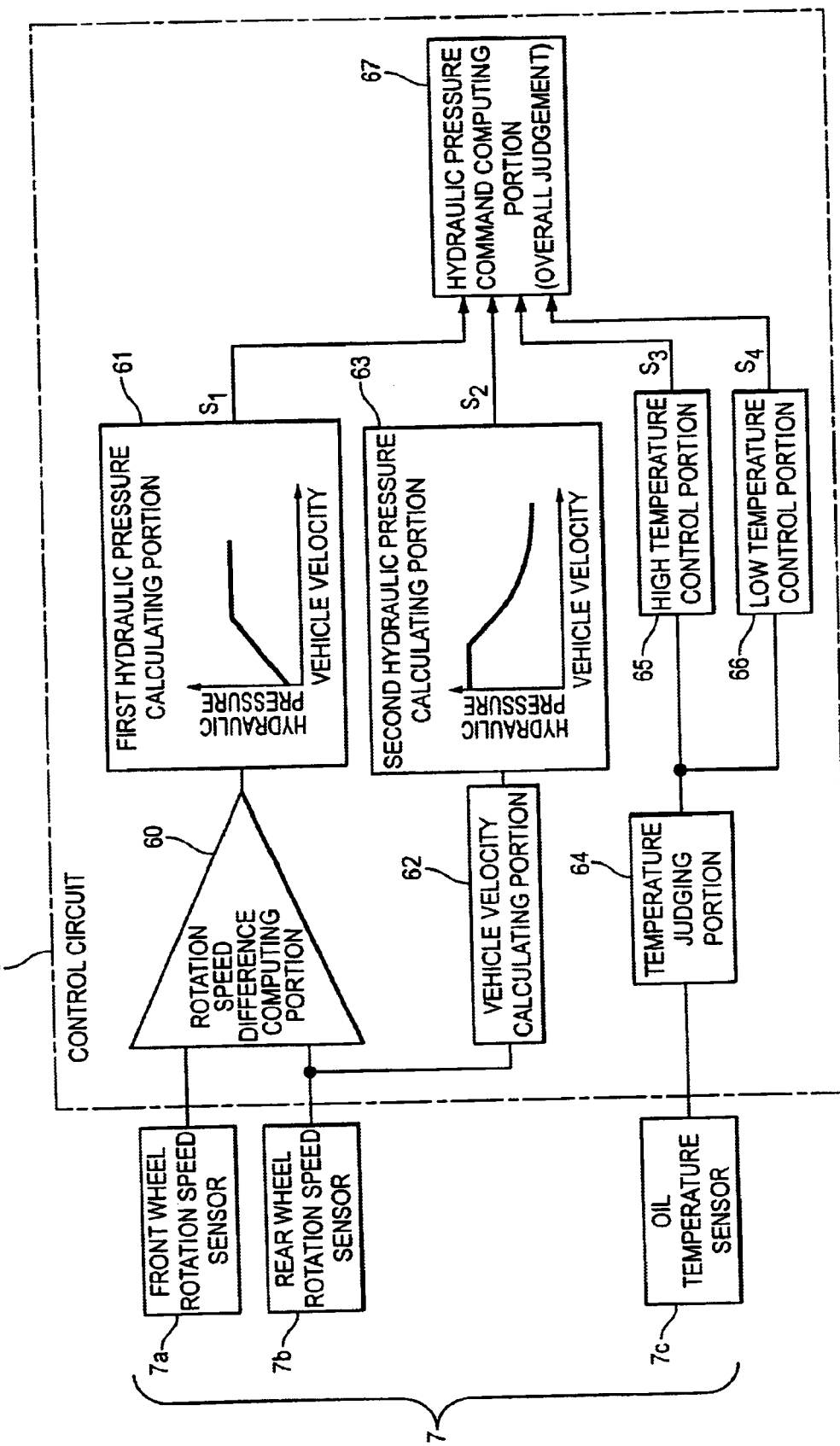

DRIVING FORCE DISTRIBUTING APPARATUS

BACKGROUND OF THE INVENTION

1. Field of the Invention

The present invention relates to a driving force distributing apparatus which is applied to a four-wheel drive vehicle and which distributes a driving force from a prime mover to front wheels and rear wheels in predetermined distributing proportions and particularly to a driving force distributing apparatus in which the number of parts is reduced to cut a cost and a capacity is reduced to lessen constraints to a vehicle design without impairing excellent responsivity of a prior-art apparatus.

2. Description of the Related Art

In recent years, as use of automobiles is diversified, more and more four-wheel drive vehicles are used suddenly. In the four-wheel drive vehicle, a driving force distributing apparatus for distributing a driving force generated by an engine to front wheels and rear wheels by a hydraulic multiple disc clutch is used conventionally.

FIG. 7 shows a basic structure of a four-wheel drive vehicle to which the prior-art driving force distributing apparatus is applied. The driving force generated by an engine 101 is transferred to the driving force distributing apparatus 1 through a transmission 102 and a center drive shaft 103, hydraulic oil at predetermined hydraulic pressure is supplied from a hydraulic pressure unit 5 to a multiple disc clutch 23 built into the driving force distributing apparatus 1, and the driving force from the engine 101 is transferred to rear wheels 105 through the center drive shaft 103 and a differential 104 and is transferred to front wheels 107 through a front drive shaft 106 and the differential 104 in predetermined distributing proportions. Control of hydraulic pressure to the multiple disc clutch 23 is carried out by controlling the hydraulic pressure unit 5 by the control circuit 6.

FIG. 8 shows the prior-art driving force distributing apparatus 1 shown in FIG. 7. The driving force distributing apparatus 1 includes an apparatus main body 2A, the hydraulic pressure unit 5 connected to the apparatus main body 2A through a pipe 5a, and the control circuit 6 for controlling the hydraulic pressure unit 5. In the apparatus main body 2A, the multiple disc clutch 23, a pressing member 25 for pressing the multiple disc clutch 23, a lever 13 for pressing the pressing member 25, and a piston 14 for moving the lever 13 in a rotating manner are disposed.

The hydraulic pressure unit 5 includes an oil pump 50 for pressure-sending the hydraulic oil, a pump motor 51 for driving the oil pump 50, an accumulator 53 for accumulating a pressure of the hydraulic oil pressure-sent from the oil pump 50 through a check valve 52, a pressure switch 54 for detecting line pressure, a pressure control valve 56 connected through a filter 55 to control the line pressure, a relief valve 57 for operating at pressure equal to or higher than predetermined pressure to relieve the hydraulic oil, and a reservoir tank 58 for receiving the hydraulic oil returning from the pressure control valve 56 and the relief valve 57.

In the driving force distributing apparatus 1 formed as described above, if the oil pump 50 pressure-sends the hydraulic oil by driving of the pump motor 51, the pressure of the hydraulic oil is accumulated by the accumulator 53 and the pump motor 51 is ON/OFF controlled by the pressure switch 54 such that the line pressure is in a predetermined pressure range. A part of the hydraulic oil pressure-sent from the oil pump 50 and controlled to be at pressure in the predetermined pressure range is returned to the reservoir tank 58 according to an opening degree of the pressure control valve 56 controlled by the control circuit 6. As a result, hydraulic pressure of the hydraulic oil supplied to the piston 14, i.e., pressure on the multiple disc clutch 23 (clutch pressure) is adjusted. In this manner, by controlling the opening degree of the pressure control valve 56, the clutch pressure can be controlled further continuously and optimum power distribution can be achieved under various traveling conditions.

However, according to the prior-art driving force distributing apparatus, because many parts are necessary for a hydraulic pressure control mechanism and expensive parts such as a current control pressure regulating valve are included in the parts, the apparatus as a whole is expensive. Because a capacity of the hydraulic pressure unit is large, a place in the vehicle in which the hydraulic pressure unit is mounted is limited. Therefore, the hydraulic pressure unit needs to be disposed in a place at a distance from a transfer and the hydraulic piston on a transfer side and the hydraulic pressure unit need to be coupled by a flexible hydraulic pipe.

Therefore, it is an object of the invention to provide a driving force distributing apparatus in which the number of parts is reduced to cut a cost and a capacity is reduced to lessen constraints to a vehicle design without impairing excellent responsivity of the prior-art apparatus.

SUMMARY OF THE INVENTION

To achieve the above object, according to the present invention, there is provided a driving force distributing apparatus for pressing a multiple disc clutch with a predetermined pressing force by a pressing member to transfer a driving force from a prime mover to a front wheel and a rear wheel in distributing proportions corresponding to the predetermined pressing force, the apparatus comprising: a piston for pressing the multiple disc clutch through the pressing member; a pump for supplying pressure fluid to a piston chamber, the pressure fluid being for generating the pressing force for pressing the pressing member in the piston; a motor for driving the pump for normal rotation to supply the pressure fluid to the piston chamber; pressure fluid discharging means provided to a pressure fluid supply path extending from the pump to the piston chamber to discharge the pressure fluid on a piston chamber side in the pressure fluid supply path to an outside when a pressure difference between pressure on the piston chamber side and pressure on a pump side in the pressure fluid supply path becomes equal to or greater than a predetermined value; and control means for driving the motor for normal rotation to drive the pump for normal rotation in increasing pressure in the piston chamber and for driving the motor for reverse rotation to drive the pump for reverse rotation to make the pressure difference equal to or greater than the predetermined value in reducing the pressure in the piston chamber.

With the above structure, in reducing the pressure in the piston chamber, by driving the pump motor for reverse rotation, the pressure difference between the piston chamber side pressure and the pump side pressure in the pressure fluid supply path increases and the pressure fluid on the piston chamber side in the pressure fluid supply path is instantaneously discharged outside.

BRIEF DESCRIPTION OF THE ACCOMPANYING DRAWINGS

Figure 3A:
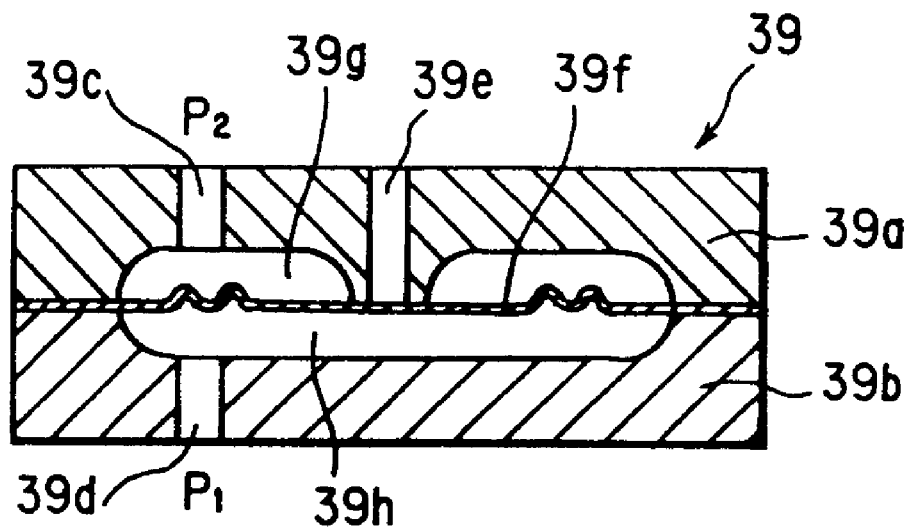
Figure 3B:
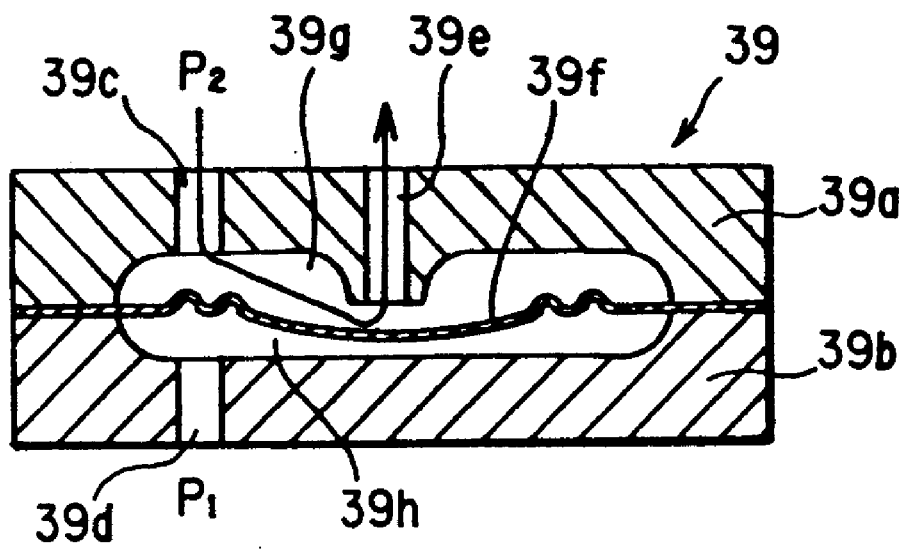
Figure 4A:
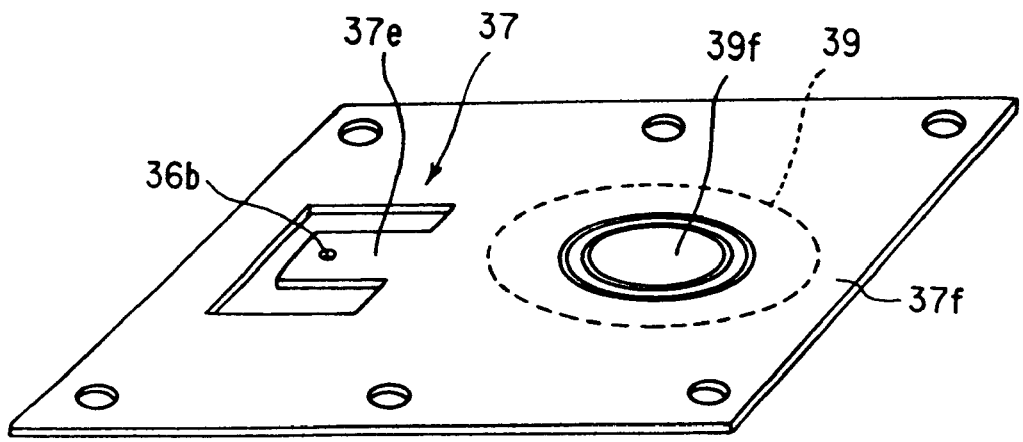
Figure 4B:
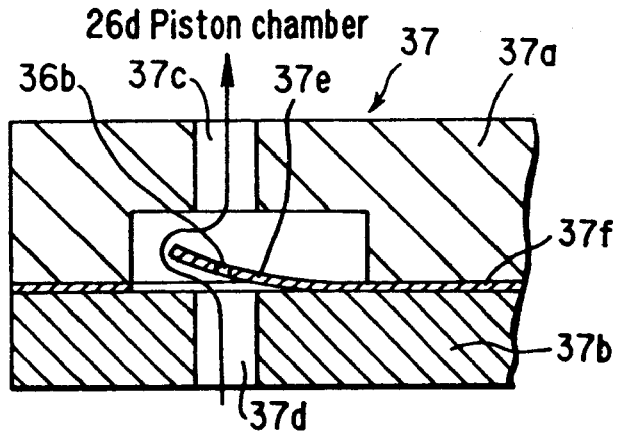
Figure 4C:
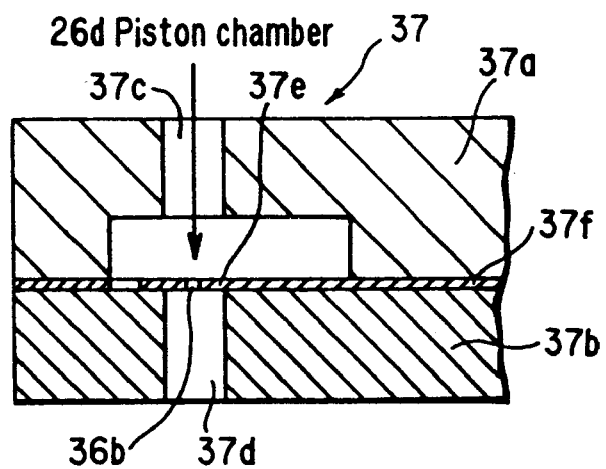
Figure 6:
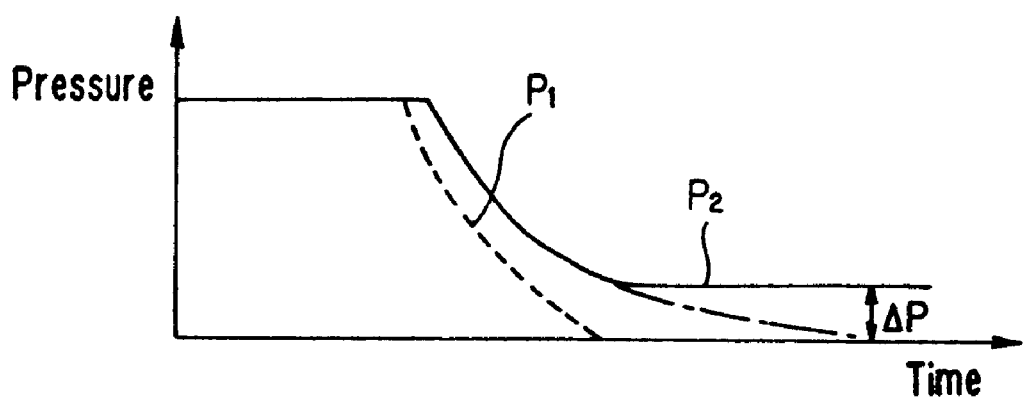
Figure 7:
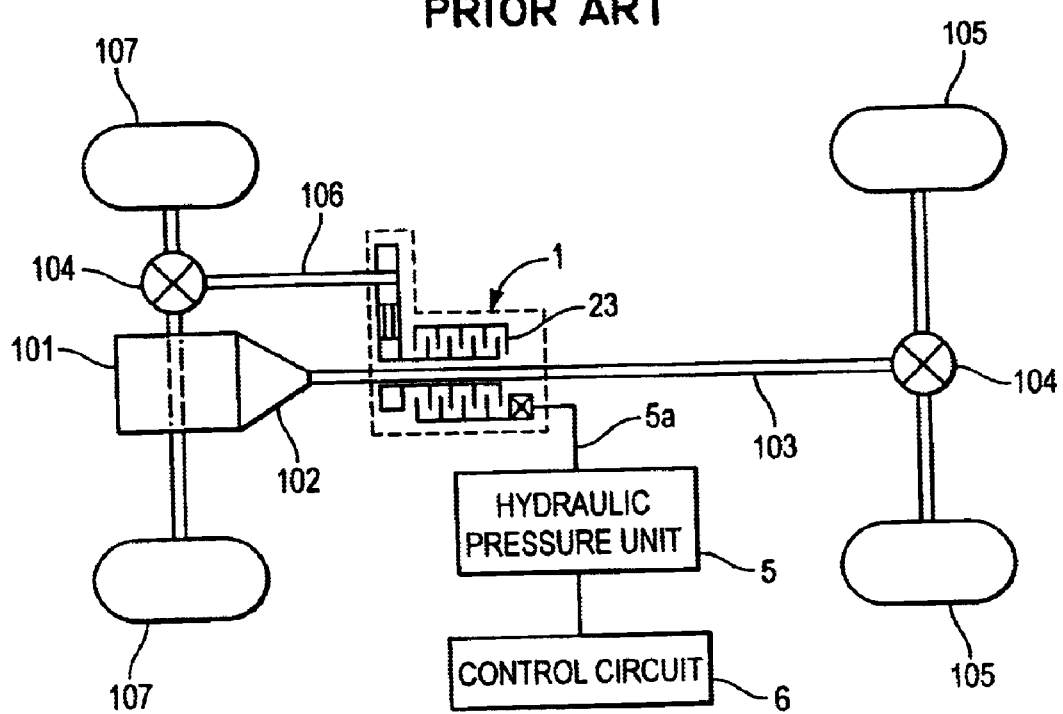
Figure 8:
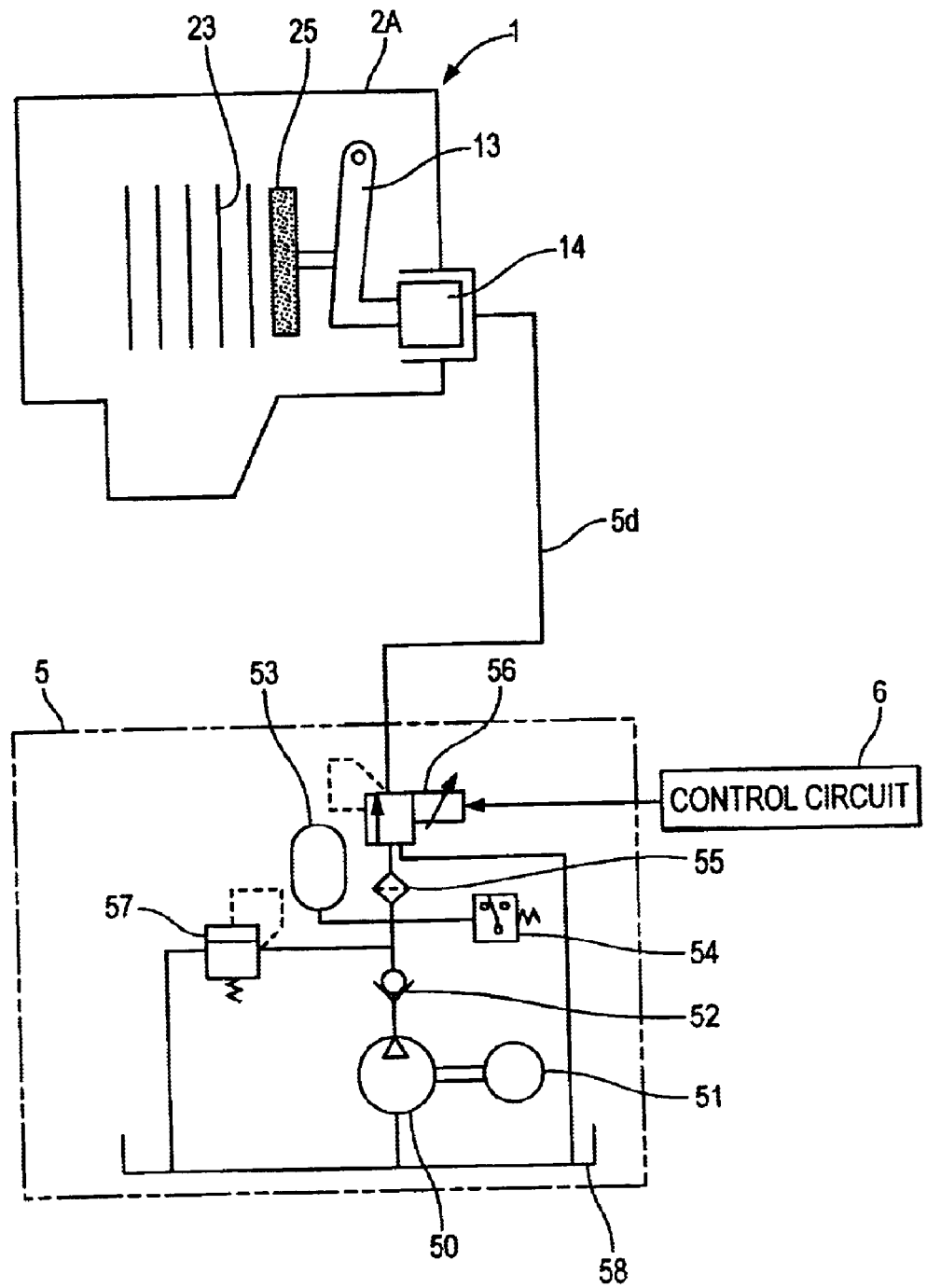

FIGS. 3(a) and 3(b) are sectional views of a structure of a quick open valve according to the embodiment of the invention;

FIG. 4(a) is a perspective view and FIGS. 4(b) and 4(c) are sectional views of a structure of a backflow preventing valve according to the embodiment of the invention;

FIG. 5 shows a structure of a part of a control circuit according to the embodiment of the invention;

FIG. 6 is a drawing for explaining operation of a bypass orifice of the hydraulic oil supply mechanism according to the embodiment of the invention;

FIG. 7 shows a basic structure of a four-wheel drive vehicle to which a prior-art driving force distributing apparatus is applied; and FIG. 8 is a block diagram of the prior-art driving force distributing apparatus.

DETAILED DESCRIPTION OF THE PREFERRED EMBODIMENTS

Figure 1:
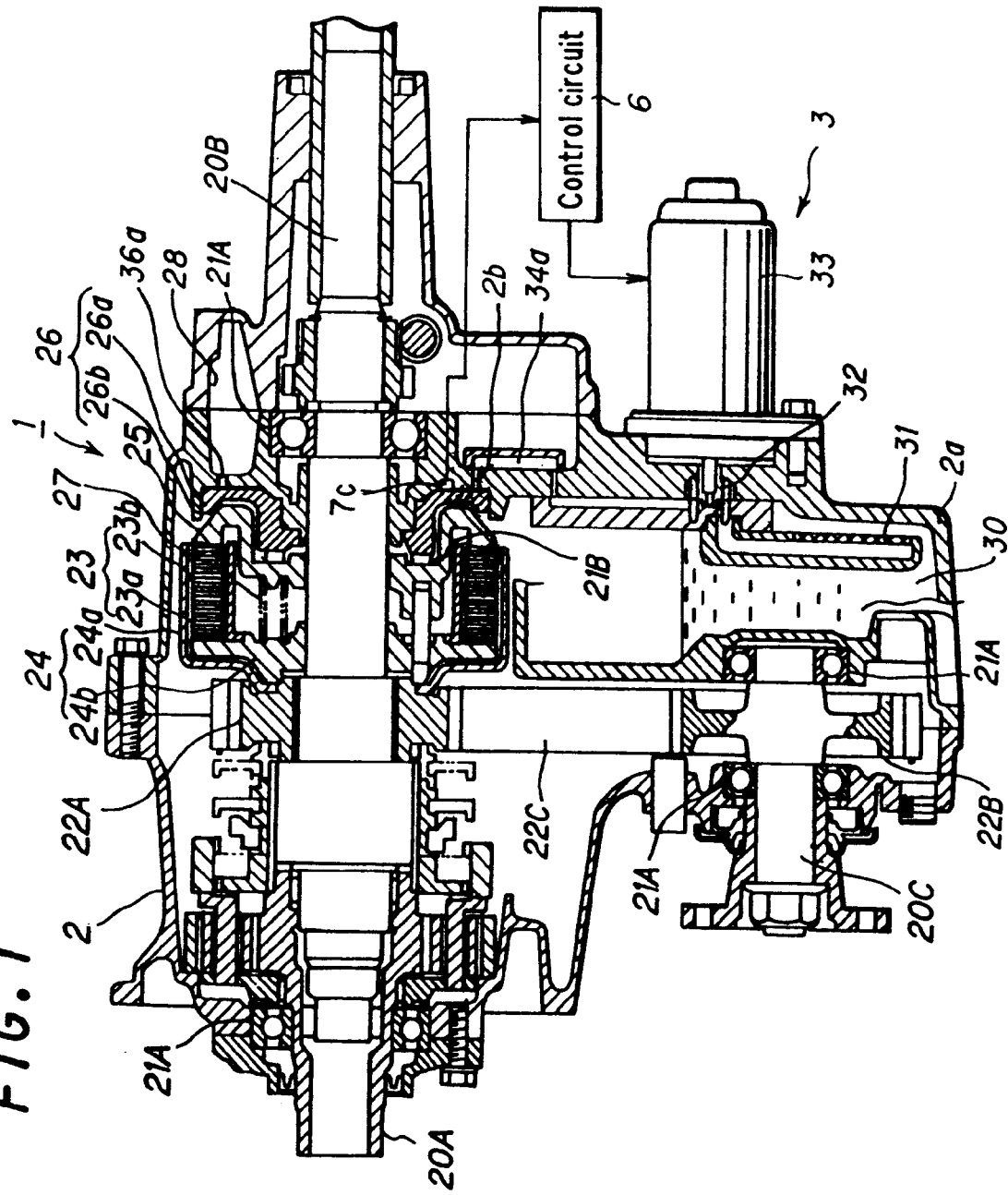
FIG. 1 shows a structure of a driving force distributing apparatus according to an embodiment of the present invention.

FIG. 1 shows a driving force distributing apparatus according to a first embodiment of the present invention. A driving force distributing apparatus 1 is applied to a four-wheel drive vehicle shown in FIG. 5 and includes a case 2. In the case 2, an input shaft 20A into which driving torque is input from an engine 101 shown in FIG. 7 through a transmission 102 and a center drive shaft 103, a rear-wheel output shaft 20B disposed coaxially with the input shaft 20A, and a front-wheel output shaft 20C disposed in parallel with the input shaft 20A are accommodated. The input shaft 20A, rear-wheel output shaft 20B, and front-wheel output shaft 20C are supported in the case 2 through ball bearings 21A.

On an outer periphery of the rear-wheel output shaft 20B, a drive sprocket 22A for passing through and being supported on the rear-wheel output shaft 20B such that the drive sprocket 22A is not connected to the rear-wheel output shaft 20B, a clutch housing 24 in which a multiple disc clutch 23 is accommodated, a pressing member 25 for pressing or opening the multiple disc clutch 23, and a piston 26 for pressing the pressing member 25 are provided. The multiple disc clutch 23 is formed of a plurality of driven plates 23a and drive plates 23b for coming into plane contact with each other to transfer driving torque. The clutch housing 24 is formed of a clutch drum 24a in which the driven plates 23a are accommodated and which is supported on the drive sprocket 22A to be connected to the drive sprocket 22A and a hub 24b in which the drive plates 23b are accommodated and which is supported on the rear-wheel output shaft 20B to be connected to the rear-wheel output shaft 20B. In order to separate the driven plates 23a and the drive plates 23b from each other in opening of the multiple disc clutch 23, a clutch spring 27 is disposed between the hub 24b and the pressing member 25. The piston 26 is formed of a cylinder portion 26b integrated with the case 2 and a piston main body 26a for moving in the cylinder portion 26b by hydraulic oil 30. In order to allow the piston main body 26a to transfer a pressing force to the rotating pressing member 25, a needle bearing 21B is disposed between the pressing member 25 and the piston main body 26a.

On an outer periphery of the front-wheel output shaft 20C, a driven sprocket 22B is provided. Around the driven sprocket 22B and the drive sprocket 22A, a chain 22C is wound.

The present apparatus 1 includes a hydraulic oil supply mechanism 3 for supplying hydraulic oil to the piston 26. The hydraulic oil supply mechanism 3 includes an oil pump 32 such as a trochoid pump for drawing in and pressure-sending the hydraulic oil 30 stored in a lower portion 2a of the case 2 through a strainer 31, a pump motor 33 which drives the oil pump 32 and can rotate normally and reversely, and a supply path 34a and a supply hole 2b for forming a supply oil path for the hydraulic oil 30 pressure-sent by the oil pump 32 between the oil pump 32 and the piston 26.

The piston 26 is formed of the cylinder portion 26b integrated with the case 2, the piston main body 26a for moving in the cylinder portion 26b by the hydraulic oil 30, and packing provided to the piston main body 26a to prevent leakage of the hydraulic oil 30. An orifice 36a is provided to an uppermost portion of a piston chamber 26d. Because air is less liable to accumulate in the piston chamber 26d by providing the orifice 36a to the uppermost portion, responsivity is improved. The hydraulic oil 30 which has returned from the orifice 36a is saved in the lower portion 2a of the case 2 through a discharge path 28. A reference numeral 26c designates the packing provided to the piston main body 26a.

Figure 2:
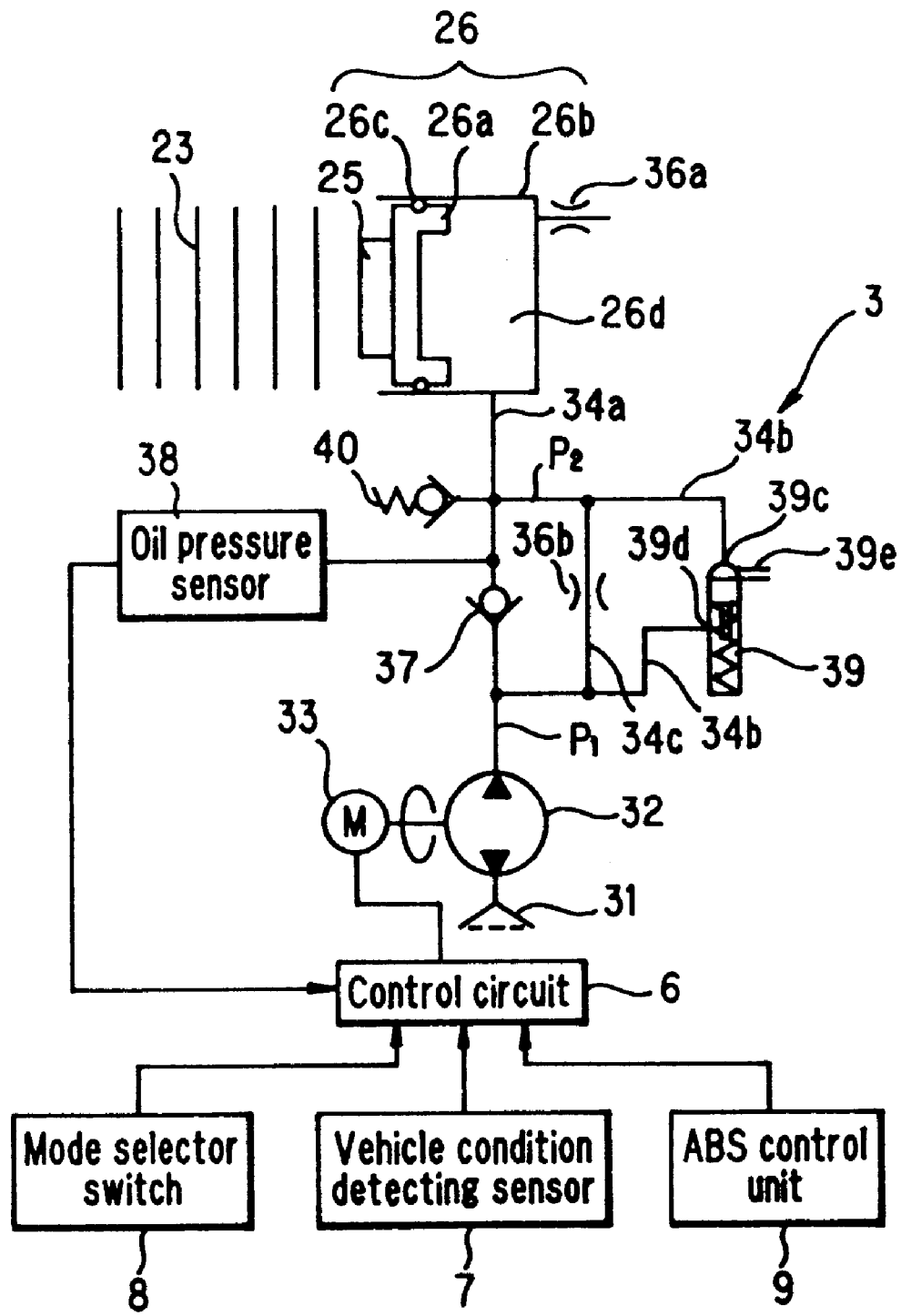
FIG. 2 shows an oil hydraulic circuit of a hydraulic oil supply mechanism according to the embodiment of the invention.

FIG. 2 shows an oil hydraulic circuit of the hydraulic oil supply mechanism 3. The oil hydraulic circuit includes the oil pump 32 driven by the pump motor 33 and the supply path 34a for introducing the hydraulic oil 30 from the oil pump 32 into the piston chamber 26d. A backflow preventing valve 37 for preventing backflow of the hydraulic oil 30 from the piston chamber 26d and an oil pressure sensor 38 for detecting a piston-side pressure $P_2$ of the hydraulic oil 30 are provided in the supply path 34a, a bypass orifice 36b and a quick open valve 39 are provided in parallel with the backflow preventing valve 37 and through branch paths 34b and 34c, and a relief valve 40 is connected to the supply path 34a between the oil pressure sensor 38 and the piston chamber 26d. Because oil in the oil hydraulic circuit is prevented from draining off by the backflow preventing valve 37 when the pump motor 33 is stopped, it is possible to prevent formation of an air pocket in the oil hydraulic circuit and impairment of responsivity. By providing the supply hole 2b shown in FIG. 1 to an upper portion of the piston chamber 26d of the piston 26, a drained amount of the hydraulic oil 30 can be reduced in a case of a failure of the backflow preventing valve 37.

FIGS. 3(a) and 3(b) show a structure of the quick open valve 39. The quick open valve 39 includes a first body member 39a connected to the piston chamber 26d through a first hole 39c, a second body member 39b connected to the oil pump 32 through a second hole 39d, and a diaphragm plate 39f sandwiched between the first body member 39a and the second body member 39b to form pressure chambers 39g and 39h isolated from each other on opposite sides of the diaphragm plate 39f. When a pressure difference between piston chamber side pressure $P_2$ in the pressure chamber 39g and a pump side pressure $P_1$ in the pressure chamber 39h increases over a predetermined value, by deformation and movement of the diaphragm plate 39f as shown in FIG. 3(b), the hydraulic oil 30 on the piston chamber 26d side is released outside the oil path through a releasing hole 39e.

FIG. 4 shows a structure of the backflow preventing valve 37. The backflow preventing valve 37 is formed of a metal sheet 37f integrally with the diaphragm plate 39f. A backflow preventing valve portion 37e is formed by forming an angular-U-shaped notch in the metal sheet 37f and the bypass orifice 36b is formed at the backflow preventing valve portion 37e. The backflow preventing valve 37 includes a first body member 37a connected to the piston chamber 26d through a first hole 37c, a second body member 37b connected to the oil pump 32 through a second hole 37d, and the metal sheet 37f sandwiched between the first body member 37a and the second body member 37b and the backflow preventing valve portion 37e is positioned between the first hole 37c and the second hole 37d. For sending the hydraulic oil 30 from the oil pump 32 to the piston chamber 26d, the backflow preventing valve portion 37e is opened as shown in FIG. 4(b). For preventing backflow of the hydraulic oil 30 from the piston chamber 26d side to the oil pump 32 side, the backflow preventing valve portion 37e is closed as shown in FIG. 4(c). The first and second body members 39a and 39b of the quick open valve 39 and the first and second body members 37a and 37b of the backflow preventing valve 37 may be respectively formed of common first and second body members.

In the relief valve 40, pressure slightly higher than a normal upper limit value of pressure control is set. Therefore, the relief valve 40 does not operate in a normal state. However, if the apparatus is not used for a long time, the oil in the oil path drains off, air accumulates inside, and the responsivity may be impaired. To avoid such a problem, a driver turns on a key switch (not shown) of a vehicle to fully apply battery voltage to the pump motor 33 by control of a control circuit 6 and to allow the hydraulic oil 30 to flow through the relief valve 40 to thereby allow the air in the inside to escape.

The control circuit 6 is for controlling current supplied to the pump motor 33 such that the oil pump 32 generates corresponding hydraulic pressure based on mode selecting signals such as a 4WD mode, a 2WD mode, and a full-time 4WD mode (a mode in which hydraulic pressure is supplied to the piston 26 according to a condition of a road surface) from a mode selector switch 8. The control circuit 6 controls the pump motor 33 such that a detected value from the oil pressure sensor 38 is equal to a hydraulic pressure command value computed based on a detection signal from a vehicle condition detecting sensor 7. The control circuit 6 also diagnoses failure of the oil pressure sensor 38 based on the current of the pump motor 33 and the detected value of the oil pressure sensor 38. If the control circuit 6 judges that the oil pressure sensor 38 is out of order, the control circuit 6 sets pressure in the supply path 34 at a pressure value determined by a relief pressure of the relief valve 40 by fully applying the battery voltage to the pump motor 33. Thus, a function of the four-wheel drive can be ensured. The control circuit 6 switches the mode from 4WD to 2WD based on an ABS operating signal indicating a start of actuation of an ABS from an ABS control unit 9.

FIG. 5 shows a portion of the control circuit 6 for computing the hydraulic pressure command value based on the detection signal from the vehicle condition detecting sensor 7. The vehicle condition detecting sensor 7 is formed of a front wheel rotation speed sensor 7a for detecting a rotation speed of a front wheel, a rear wheel rotation speed sensor 7b for detecting a rotation speed of a rear wheel, and an oil temperature sensor 7c for detecting a temperature of the hydraulic oil 30 in the piston chamber 26d, for example. The control circuit 6 includes a rotation speed difference computing portion 60 for computing a rotation speed difference between the front wheel and the rear wheel based on a detection signal from the front wheel rotation speed sensor 7a and a detection signal from the rear wheel rotation speed sensor 7b, a first hydraulic pressure calculating portion 61 for storing information about a relationship between the rotation speed difference and hydraulic pressure and for outputting a signal $S_1$ indicating corresponding hydraulic pressure in the information about the relationship between the rotation speed difference and hydraulic pressure based on the rotation speed difference computed by the rotation speed difference computing portion 60, a vehicle velocity calculating portion 62 for calculating a vehicle velocity based on the detection signal from the rear wheel rotation speed sensor 7b, a second hydraulic pressure calculating portion 63 for storing information about a relationship between the vehicle velocity and hydraulic pressure and for outputting a signal S2 indicating corresponding hydraulic pressure in the information about the relationship between the vehicle velocity and the hydraulic pressure based on the vehicle velocity calculated by the vehicle velocity calculating portion 62, a temperature judging portion 64 for judging whether the hydraulic oil 30 in the piston chamber 26d is at a high temperature or a low temperature based on a detection signal from the oil temperature sensor 7c, a high temperature control portion 65 for outputting a control signal $S_3$ for a case of the high temperature when the hydraulic oil 30 is judged to be at the high temperature by the temperature judging portion 64, a low temperature control portion 66 for outputting a control signal $S_4$ for a case of the low temperature when the hydraulic oil 30 is judged to be at the low temperature by the temperature judging portion 64, and a hydraulic pressure command computing portion 67 for making an overall judgement on the respective signals $S_1$ to $S_4$ to compute the hydraulic pressure command value.

FIG. 6 shows operation of the bypass orifice 36b. If the oil hydraulic circuit of the hydraulic oil supply mechanism 3 has no leak, differential pressure AP of the quick open valve 39 when pressure reducing operation finishes remains as shown in a solid line in FIG. 6. Therefore, by providing the bypass orifice 36b in parallel with the quick open valve 39, the bypass orifice 36b has a function of allowing the differential pressure ΔP to escape after the quick open valve 39 is closed as shown in a single dotted line in FIG. 6. Because most of the hydraulic oil 30 escapes outside the oil path through the releasing hole 39e of the quick open valve 39, a flow through the bypass orifice 36b can be ignored.

Next, operation of the present apparatus 1 will be described. A case in which the driver operates the mode selector switch 8 to select the full-time 4WD mode will be described. The mode selector switch 8 outputs the mode selecting signal indicating the full-time 4WD mode to the control circuit 6. The control circuit 6 controls the pump motor 33 so as to supply corresponding hydraulic pressure to the piston 26 based on the detection signal from the vehicle condition detecting sensor 7. For example, if the control circuit 6 judges that the vehicle should travel in the 4WD mode with a strong degree of coupling between the front and rear wheels because of a bad condition of the road surface based on the detection signal from the vehicle condition detecting sensor 7, the control circuit 6 controls current supplied to the pump motor 33 so as to supply corresponding hydraulic pressure to the piston 26 to drive the pump motor 33 for normal rotation. By driving of the pump motor 33, the oil pump 32 supplies the hydraulic oil 30 at predetermined pressure to the piston 26.

On the other hand, if the ABS operating signal indicating a start of actuation of the ABS is output from the ABS control unit 9, the control circuit 6 performs control for switching from 4WD to 2WD. In other words, the control circuit 6 rotates the pump motor 33 in a reverse direction to reduce pressure in the piston chamber 26d based on the ABS operating signal. In the vehicle having the ABS, it is preferable to achieve 2WD in which the front and rear wheels are not coupled with each other for proper operation of the ABS. For this purpose, the pressure needs to be reduced quickly. However, by only reversely rotating the pump motor 33, a sufficient pressure reducing speed cannot be obtained. In the present embodiment, because backflow of the hydraulic oil 30 from the piston chamber 26d is prevented by the backflow preventing valve 37, the piston side pressure $P_2$ is generated in the supply path 34 on the piston 26 side. If the pump motor 33 is rotated reversely, the pump side pressure $P_1$ reduces and a pressure difference is generated between the piston side pressure $P_2$ and the pump side pressure $P_1$. When the pressure difference increases over a predetermined value, the quick open valve 39 operates to release the hydraulic oil 30 on the piston chamber 26d side to the outside of the oil path through the releasing hole 39e to release the piston side pressure $P_2$. Then, if the pump side pressure $P_1$ is maintained at a constant value, the piston side pressure $P_2$ reduces by the pump side pressure $P_1$+differential pressure and the quick open valve 39 is closed.

According to the above-described present embodiment, in reducing the pressure in the piston chamber 26d, because the pump motor 33 is driven for reverse rotation to increase the pressure difference between the piston chamber side pressure $P_2$ and the pump side pressure $P_1$ in the supply path 34, the hydraulic oil 30 on the piston chamber 26d side in the supply path 34 is instantaneously released outside and clutch pressure can be reduced instantaneously. As a result, it is possible to carry out the proper operation of the ABS when the ABS is actuated in traveling in the 4WD mode.

Because the hydraulic pressure supplied to the piston 26 is controlled by controlling current supplied to the pump motor 33, the clutch pressure can be controlled continuously.

Because an expensive pressure control valve and an accumulator are unnecessary, cost can be cut and reliability can be enhanced due to a reduction in the number of parts as compared with prior art.

Furthermore, because only the pump motor 33 in the hydraulic oil supply mechanism 3 is mounted to an outside of the case 2, the apparatus 1 as a whole can be miniaturized.

Because it is sufficient for the oil pump 32 to generate only necessary pressure, a power loss is small.

Although the oil pump and the pump motor are provided to the case of the driving force distributing apparatus in the embodiment, it is possible to provide them to another place such as a vicinity of a differential and to connect the case and the oil pump by a pipe.

As described above, according to the driving force distributing apparatus of the invention, because the pressure difference between the piston chamber side pressure and the pump side pressure in the pressure fluid supply path is increased by driving the motor for reverse rotation in reducing the pressure in the piston chamber, the number of parts can be reduced to cut the cost and a capacity can be reduced to lessen constraints to a vehicle design without impairing excellent responsivity of the prior-art apparatus.

What is claimed is:

1. A driving force distributing apparatus for pressing a multiple disc clutch with a predetermined pressing force by a pressing member to transfer a driving force from a prime mover to a front wheel and a rear wheel in distributing proportions corresponding to said predetermined pressing force, said apparatus comprising:

a piston for pressing said multiple disc clutch through said pressing member;

a pump for supplying pressure fluid to a piston chamber, said pressure fluid being for generating said pressing force for pressing said pressing member in said piston;

a motor for driving said pump for normal rotation to supply said pressure fluid to said piston chamber;

pressure fluid discharging means provided to a pressure fluid supply path extending from said pump to said piston chamber to discharge said pressure fluid on a piston chamber side in said pressure fluid supply path to an outside when a pressure difference between pressure on said piston chamber side and pressure on a pump side in said pressure fluid supply path becomes equal to or greater than a predetermined value; and control means for driving said motor for normal rotation to drive said pump for normal rotation in increasing pressure in said piston chamber and for driving said motor for reverse rotation to drive said pump for reverse rotation to make said pressure difference equal to or greater than said predetermined value in reducing said pressure in said piston chamber.

2. A driving force distributing apparatus according to claim 1, wherein said pressure fluid discharging means includes a backflow preventing valve provided to said pressure fluid supply path to prevent backflow of said pressure fluid from said piston chamber to said pump and an open valve provided in parallel with said backflow preventing valve to release said pressure fluid on said piston chamber side to the outside from said backflow preventing valve in said pressure fluid supply path when said pressure difference between pressure on said piston chamber side of said backflow preventing valve and pressure on said pump side of said backflow preventing valve in said pressure fluid supply path becomes equal to or greater than said predetermined value.

3. A driving force distributing apparatus according to claim 2, wherein said pressure fluid discharging means includes a relief valve provided in said pressure fluid supply path between said backflow preventing valve and said piston chamber and said control means controls said motor with a maximum output based on a command signal from the outside to releave air in said pressure fluid supply path to the outside from said relief valve.

4. A driving force distributing apparatus according to claim 1, wherein said control means includes a pressure sensor for detecting pressure on said piston side in said pressure fluid supply path and controls said motor such that a detected value of said pressure sensor is equal to a fluid pressure command value computed based on a detection signal from a vehicle condition detecting sensor.

5. A driving force distributing apparatus according to claim 1, wherein said control means includes a pressure sensor for detecting pressure on said piston side in said pressure fluid supply path, controls said motor such that a detected value of said pressure sensor is maintained at a predetermined fluid pressure command value for a certain time period, computes pressure in said piston chamber based on current of said motor during said control, and has a failure diagnosing mode for making a diagnosis of failure when a pressure difference between said computed value and a detected value of said pressure sensor exceeds a predetermined value.

6. A driving force distributing apparatus according to claim 1, wherein said pressure fluid discharging means includes a bypass orifice provided in parallel with said backflow preventing valve.

7. A driving force distributing apparatus according to claim 1, wherein said pressure fluid discharging means includes a first body member connected to said piston chamber, a second body member connected to said pump, a diaphragm plate sandwiched between said first body member and said second body member to isolate a first pressure chamber provided to said first body member and a second pressure chamber provided to said second body member from each other, and an open valve for releasing said pressure fluid on said piston chamber side to the outside by deformation and movement of said diaphragm plate when a pressure difference is generated between said first and second pressure chambers.

8. A driving force distributing apparatus according to claim 7, wherein said pressure fluid discharging means includes a bypass orifice provided in parallel with said backflow preventing valve, said backflow preventing valve is molded integrally with said diaphragm plate, and said bypass orifice is provided to said diaphragm plate.

* * * * *